United States Patent
Smollinger

[15] 3,705,489
[45] Dec. 12, 1972

[54] WIRE ROPE WITH PERMANENTLY LUBRICATED CORE
[72] Inventor: Carl W. Smollinger, Williamsport, Pa.
[73] Assignee: Bethlehem Steel Corporation
[22] Filed: Dec. 24, 1970
[21] Appl. No.: 101,235

[52] U.S. Cl. .................................... 57/149, 57/153
[51] Int. Cl. ......................... D07b 1/06, D07b 1/16
[58] Field of Search.57/139, 140 R, 140 C, 144–146, 57/148, 149, 153, 161, 162, 164, 166,

[56] References Cited
UNITED STATES PATENTS
3,540,203  11/1970  Thoresen et al. .................... 57/149

2,485,019  10/1949  Somerville ........................... 57/153
2,162,130   6/1939  Somerville ....................... 67/149 X
2,167,098   7/1939  Wells ............................... 57/147 X
2,427,507   9/1947  Powell et al. ................... 57/153 X
2,018,230  10/1935  Robertsan .......................... 57/146

Primary Examiner—Donald E. Watkins
Attorney—Joseph J. O'Keefe

[57] ABSTRACT

A wire rope having an independent wire rope core or wire strand core has a heavy lubrication permanently encapsulated within the core by a thick plastic sheath or jacket surrounding the core and spacing the outer strands of the rope from the component wires or strands of the core.

9 Claims, 7 Drawing Figures

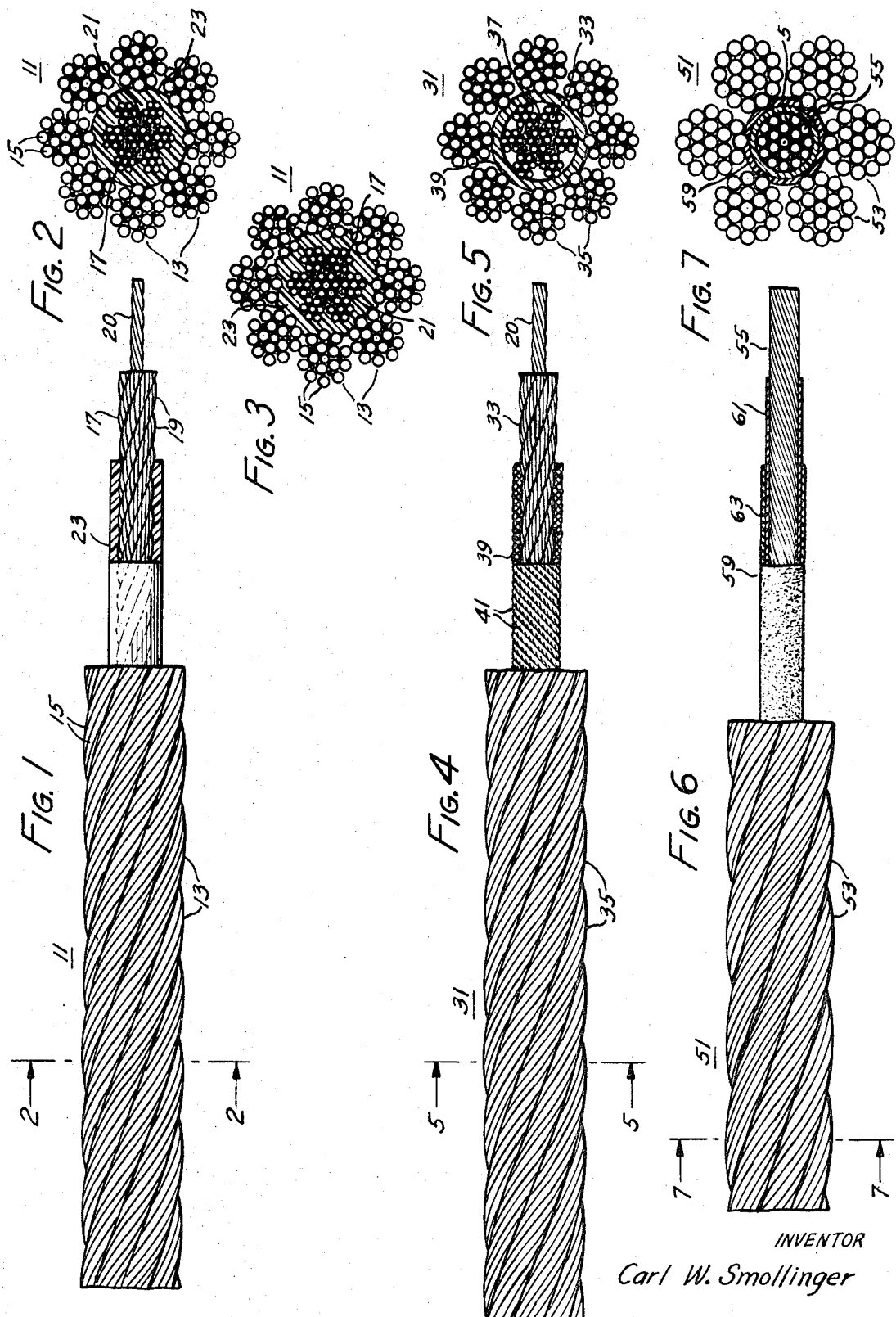

WIRE ROPE WITH PERMANENTLY LUBRICATED CORE

BACKGROUND OF THE INVENTION

The present invention relates to wire ropes and particularly to the adequate lubrication of wire ropes.

Working wire ropes and strands of all types, in contrast with static or structural ropes and strands, are lubricated in order to decrease friction between the component wires of the strand or rope and thereby facilitate flexing of the strand or rope and decrease internal wear. An unlubricated rope or strand will have a very short working life due to the heat and wear generated by the movements between the component wires.

In the manufacture of wire ropes it has been the long established custom to provide a very copious lubrication of the core of the rope at the time of manufacture, whether the core is a wire or a hemp core. The theory has been that the lubrication in the core will gradually work out into the outer strands as the rope is used so that all sections of the rope will be continuously lubricated during use. In the early wire ropes this lubrication of the core was often sufficient, combined with periodic external lubrication of the rope, to maintain adequate lubrication of the entire wire rope during the normal useful life of the rope. As the life of wire ropes has increased, due to the use of improved steels and more sophisticated constructions, it has become more and more difficult to maintain adequate lubrication in the foregoing manner. Various means such as spiral wrappings of thin metal strips or the like have at times been used to retard the rate of seepage of lubrication from the core into the outer strands of wire ropes so that the overall lubricated life of the rope may be extended. This, however, has merely increased the difficulty of relubricating the core after all or substantially all the lubrication has seeped from the core into the outer strands.

The outer strands as a practical matter can be periodically lubricated by external means but it is virtually impossible to force adequate lubrication into the core of a wire rope once it has been placed in use. The result has been that the service life of the rope has in many instances been determined by the life of the lubrication within the core of the rope. It has been discovered that this limitation of life occurs because upon the exhaustion of the lubrication within the core of a rope the core will forthwith begin to disintegrate, leading in short order to failure of the entire rope.

SUMMARY OF THE INVENTION

The foregoing difficulties have been obviated by the present invention of the applicant. In accordance with the invention lubrication is permanently encapsulated within the core of a wire rope by means of a layer of flexible plastic surrounding the core. This layer of plastic also cushions the outer strands upon the core. As the lubrication in the outer strands of the rope is exhausted during use of the rope the outer lubrication can be easily replaced from external sources while the lubrication in the hard-to-lubricate core of the rope is completely prevented from escaping from the core and thus lasts for the normal life of the rope as determined by its use and the physical characteristics of the component wires and physical structure of the rope.

BRIEF DESCRIPTION OF THE DRAWINGS

FIG. 1 is a partially cut away view of a wire rope assembly comprising a plurality of outer strands enclosing an extruded plastic jacket about a permanently lubricated independent wire rope core.

FIG. 2 is a cross-section taken at 2—2 of FIG. 1 after closing the rope and prior to hard working and/or prestressing of the rope.

FIG. 3 is a cross-section of FIG. 1 as at 2—2 but subsequent to prestressing and working of the rope.

FIG. 4 is a partially cut away view of a wire rope having a fibrous plastic jacket about the core of the rope.

FIG. 5 is a cross-section taken at 5—5 of FIG. 4 after closing and prior to hard working of the rope.

FIG. 6 is a partially cut away view of another embodiment of the invention having a combined tubular and fibrous plastic jacket over a wire strand core.

FIG. 7 is a cross-section at 7—7 of FIG. 6 after closing and prior to hard working of the rope.

DESCRIPTION OF THE PREFERRED EMBODIMENTS

In FIGS. 1, 2 and 3 there is shown a wire rope 11 having eight helically twisted outer strands 13 composed of individual wires 15. The strands 13 are helically stranded about an independent wire rope core 17 which in turn is composed of outer strands 19 twisted about a central wire strand core 20. Core 17 and its component parts are visible in the broken away section of FIG. 1. Core 17 is impregnated with a heavy permanent lubrication 21 having a viscosity sufficient to prevent it from flowing longitudinally in the core under the influence of gravity if a section of the rope is disposed either temporarily or permanently in a vertical position. The lubrication 21 is permanently locked into core 17 by a tubular jacket 23 of a suitable plastic such as nylon or high density polyethylene or polypropylene.

Preferably the core 17 is somewhat smaller than a normal core for a rope having the same outer dimensions in order to allow room for a jacket 23 of plastic thicker than could otherwise be accommodated within the confines of the rope structure. The thicker jacket 23 not only provides for a longer lasting, stronger jacket to permanently confine the lubrication within the core 17, but also allows the plastic to act as a cushion between the outer strands 13 and the core 17 to further reduce internal wear between the component parts of the rope. The core 17 need not be decreased proportionately to the thickness of plastic in the jacket 23 because, as shown in FIG. 3, the outer strands will seat themselves into the plastic under the effect of repetitive working loads applied to the rope. A small amount of compression and recovery of the plastic occurs under these loads and during any prestressing to which the rope is initially subjected. The plastic of the jacket does not have total recovery so that as the rope continues to operate under load the outer strands gradually form individual support pockets in the plastic jacket providing more complete support around the individual strands, improving flexibility of the rope and maintaining slight but desirable clearances between the outer strands 13. The jacket also simultaneously maintains desirable clearances between the underside of the outer strands and the wires of the metal core.

The diameter of the core of the rope, whether this core is an independent wire rope core as shown in FIGS. 1 to 5 inclusive, or a wire strand core as shown in FIGS. 6 and 7, can be reduced as much as 15 to 17 percent from the normal size in a comparable rope without drastically reducing the overall strength of the wire rope. A jacket having a thickness sufficient to increase the core size from 20 to 25 percent may then be placed over the lubricated core. This will allow for a 7 to 10 percent seating of the outer strands into the plastic to form the initial seat while simultaneously obtaining desirable strand clearances and allowing for further seating—and while also eliminating direct wire contact between the outer strands 13 and the core 17 during normal service and ensuring that the lubrication seal provided by the plastic jacket over the core of the rope is not broken during use. The plastic jacket thus not only prevents the lubrication from escaping from the core of the strand but also acts as a very effective cushion and vibration damper between the outer strands of the rope and the core and between the outer strands. The vibration damping effect is such that destructive lateral vibrations over the wire rope as a whole are very considerably damped out and prevented from traveling along the rope for any significant distance. The energy of the lateral vibrations is very effectively dissipated into the plastic interface between the core and the outer strands of the rope because regardless of what direction the vibration occurs it will be damped out by a layer of plastic disposed at substantially a right angle to the direction of the vibrational energy.

Because the lubrication is locked permanently within the wire rope core the outer strands are not lubricated by the lubrication seeping from the core. It is relatively easy, however, to periodically lubricate the outer strands by external means. With a little external lubrication, therefore, the wire rope of the invention with its permanently lubricated wire core will have a significantly longer life than a conventional wire rope. The jacket over the core also has the advantage of preventing dirt and grit from entering the core of the rope where great damage and wear can result. Dirt and grit which get into or between the outer strands of the rope on the other hand do not usually become locked in the strands so that damage here is not so great.

FIGS. 4 and 5 show a second embodiment of the invention in the form of a wire rope 31 having an independent wire rope core 33 shown through a cut away section through outer strands 35 of the rope 31. A viscous lubricant 37 is confined within the core 33 by a plastic jacket 39 composed of a layer of thick closely packed fibers 41 of a suitable plastic such as nylon. The plastic jacket 39 shown in FIGS. 4 and 5 is composed of closely packed braided plastic fibers, but a dense matting of plastic fibers could also be used. The fibrous nature of the jacket 39 aids in cushioning the outer strands and reducing vibration and wear within the rope. The closely packed nature of the fibrous jacket on the other hand enables the jacket to serve as a very effective container for a thick viscous lubrication so that the lubrication 37 is permanently sealed within the core 33. It is necessary, of course, that the fibrous plastic material of the jacket be of such a nature as can be closely packed, that is to say it should have smooth contacting surfaces, and that the lubrication be quite viscous. If it is desired to use a less viscous lubricant it is very desirable for the jacket to be composed of a solid plastic tube extruded or otherwise placed over the core as shown in FIGS. 1, 2 and 3 to permanently lock the lubricant 37 within the jacket. When used with a heavy viscous lubrication, however, the fibrous plastic jacket 39 is quite effective to permanently isolate the lubrication within the core 33 and also supply superior cushioning of the strands upon the core. The resilient nature of the fibrous jacket 39 is such that lateral vibrations of the strand are in addition very effectively damped out, greatly aiding in preventing excessive wear of the rope structure due to shocks and suddenly applied loads. As in the embodiment of the rope shown in FIGS. 1, 2 and 3, it is very desirable for the metal portions of the core 33 to be somewhat undersize in comparison with a conventional rope of the same dimensions in order to provide room for a thick layer of jacket material. The average strength of the rope over a period is equal to and indeed greater than average strength of a conventional rope over its working lifetime because any decrease in initial overall strength of the rope due to decreased metal area in the core 33 is compensated for by the decreased wear of the rope in the core due to increased lubrication throughout the life of the rope.

As in the embodiment shown in FIGS. 1, 2 and 3, the rope 31 of FIGS. 4 and 5 requires periodic lubrication of the outside strands 35. Escape of the heavy lubrication from the core 33 of rope 31 through the fibrous plastic jacket 39 is prevented not only by the dense closely packed nature of the plastic fibers 41 but also by the flexibility of the jacket 39 which allows it to give slightly under localized internal increases and decreases of lubrication pressure as the wire rope works during normal usage. The plastic fibers, furthermore, do not absorb the lubrication and there is consequently no wicking action which might otherwise transfer the lubrication through the jacket 39. The jacket 39 will preferably have a structure composed of braided or matted plastic fibers 41 but other closely packed fiber arrangements may also be effectively used. FIG. 5 for clarity shows a cross-section of the rope prior to working. It will be understood that subsequent to working and operation of the rope the outer strands would be seated into the plastic jacket 39 in a manner similar to that shown in FIG. 3 for a tubular jacket.

FIGS. 6 and 7 show a longitudinal section and cross-section respectively of a wire rope 51 illustrating a further embodiment of the invention. Rope 51 has outer strands 53 surrounding a wire strand core 55 seen through a broken away section of the outer strands 53. A lubricant 57 is locked within the wire strand core 55 by a composite plastic jacket 59 comprised of a first extruded plastic tube 61 immediately surrounding the core 55 and a second outer fibrous plastic layer or covering 63 surrounding the plastic tube 61. The plastic tube 61 serves to permanently confine the lubrication 57 to the core 55 while the fibrous plastic layer or covering 63 over the tube serves very effectively to cushion the outer strands upon the core and prevent wear and vibration between the component parts of the rope and in the rope as a whole. Suitable plastics for the tube and for the fibrous material are nylon, polyethylene and polypropylene. The same or different plastics may be used for both the tube and the fibrous material. The plastic of the tube should, of course, be impermeable to the lubrication and not deteriorated by the lubrication, and the plastic of the fibrous layer should have a consistency which will support and cushion the strands. The fibrous plastic layer 63 need not be as densely packed as in the embodiment of the invention shown in FIG. 3 and thus may be arranged in particular ropes to provide a more resilient bed for the cushioning of the outer strands of the rope in order to reduce wear between the outer strands 53 and the core 55 and damp out lateral vibrations along the rope.

The plastic tube 61, like the jacket 23 of the first embodiment of the invention, as shown in FIG. 2, will preferably be closely jacketed about an independent wire rope core. The jacket may also, however, but less desirably, be a somewhat looser jacket as shown in FIG. 7 about a strand type wire rope core. The same loose construction could be used about an independent wire rope core also, however, if desired, and a tight plastic jacket could also be used very effectively about a wire strand core such as the core 55 shown in FIG. 7.

I claim:

1. An operating wire rope having an improved working life comprising:
    a. a flexible wire core,
    b. a quantity of wire lubricant in said core,
    c. a flexible plastic jacket closely surrounding said core and adapted to substantially permanently seal said wire lubricant within said wire core to continuously immerse the wires of said wire core in a permanent lubrication; and
    d. a series of wire strands laid about said wire core and supported upon the outer surface of said plastic jacket.

2. A wire rope according to claim 1 wherein said flexible plastic jacket is comprised of a substantially impervious plastic layer surrounding said core adapted to contain said wire lubricant within said core and cushion the overlying strands.

3. A wire rope according to claim 2 wherein said plastic jacket is extruded upon said core.

4. A wire rope according to claim 2 wherein said core is an independent wire rope core.

5. A wire rope according to claim 2 wherein said core is a wire strand core.

6. A wire rope according to claim 1 wherein said flexible jacket comprises a dense layer of plastic fibers.

7. A wire rope according to claim 6 wherein said layer of plastic fibers is a closely packed braided layer.

8. A wire rope according to claim 6 wherein said outer strands are seated into the surface of the fibrous sheath but are cushioned and spaced thereby from the underlying core.

9. A wire rope according to claim 1 wherein said flexible plastic jacket is comprised of a first substantially impervious plastic tube immediately surrounding said core and a second layer of plastic fibers surrounding said plastic tube and cushioning said series of wire strands laid about said core.

* * * * *